US006527175B1

(12) United States Patent
Dietz et al.

(10) Patent No.: US 6,527,175 B1
(45) Date of Patent: Mar. 4, 2003

(54) INSTANT MULTIPLE PLAY GAMING TICKET AND VALIDATION SYSTEM

(76) Inventors: Michael J. Dietz, 7 Tildios, Peralta, NM (US) 87042; Earl D. Morris, 9505 Seabrook NE., Albuquerque, NM (US) 87111; Rolen Miller, 5 Camino De Corrales, Del Norte, NM (US) 87048

( * ) Notice: Subject to any disclaimer, the term of this patent is extended or adjusted under 35 U.S.C. 154(b) by 0 days.

(21) Appl. No.: 09/390,253

(22) Filed: Sep. 3, 1999

Related U.S. Application Data

(63) Continuation-in-part of application No. 08/786,005, filed on Jan. 21, 1997, now Pat. No. 5,949,042.

(51) Int. Cl.[7] ................................................ G06F 7/08

(52) U.S. Cl. ................. 235/381; 235/470; 235/462.01; 273/138.2; 463/27

(58) Field of Search ................................ 235/375, 381, 235/462.01, 462.13, 470, 487, 494; 283/100, 101, 102, 103, 105, 106, 111; 273/138.1, 138.2, 139; 463/17, 18, 26, 27; 705/1, 14

(56) References Cited

U.S. PATENT DOCUMENTS

| | | | | | |
|---|---|---|---|---|---|
| 4,174,857 | A | * | 11/1979 | Koza | 283/101 |
| 4,677,553 | A | * | 6/1987 | Roberts et al. | 463/17 |
| 4,725,079 | A | * | 2/1988 | Koza et al. | 283/139 |
| 4,842,278 | A | * | 6/1989 | Markowicz | 463/18 |
| 5,286,062 | A | * | 2/1994 | Greenwood et al. | 283/106 |
| 5,290,033 | A | * | 3/1994 | Bittner et al. | 235/381 X |
| 5,417,424 | A | * | 5/1995 | Snowden et al. | 463/18 |
| 5,475,205 | A | * | 12/1995 | Behm et al. | 235/375 |
| 5,562,284 | A | * | 10/1996 | Stevens | 273/139 |
| 5,595,538 | A | * | 1/1997 | Haste, III | 463/17 |
| 5,609,337 | A | * | 3/1997 | Clapper, Jr. | 273/138.2 |
| 5,647,592 | A | * | 7/1997 | Gerow | 273/139 |
| 5,657,899 | A | * | 8/1997 | Stoken | 463/17 |
| 5,927,716 | A | * | 7/1999 | Goodson et al. | 273/139 X |

FOREIGN PATENT DOCUMENTS

FR 2 512 992 A * 3/1983

* cited by examiner

*Primary Examiner*—Michael G. Lee
*Assistant Examiner*—Jared J. Fureman
(74) *Attorney, Agent, or Firm*—Townsend and Townsend and Crew LLP; Guy W. Chambers

(57) ABSTRACT

A multiple play gaming ticket, such as a pull-tab ticket 10 or "instant winner" lottery ticket, and a coordinating validation system. To deter fraud, a validation code 24 is provided which uniquely identifies the pull-tab ticket 10 and is not merely a representation of the indicia 22. The pull-tab ticket 10 is validated by a combination of validator machine 30 and a host computer 100. The validator machine reads the validation code and relays it the host computer to check for legitimacy (i.e., proper form and availability) and to correlate it to a stored record of gaming indicia 22. The gaming ticket of the present invention can be used in connection with fixed payouts, progressive jackpots or both. The progressive jackpot is increased by a predetermined amount each time a gaming ticket is inserted into a validation machine.

2 Claims, 10 Drawing Sheets

INSTANT MULTIPLE PLAY GAMING TICKET AND VALIDATION SYSTEM

This application is a continuation-in-part of and claims the benefit of U.S. patent application Ser. No. 08/786,005, filed Jan. 21, 1997, now U.S. Pat. No. 5,949,042 and also entitled "Instant Multiple Play Gaming Ticket And Validation System."

TECHNICAL FIELD OF THE INVENTION

The present invention relates to pull-tabs, lottery tickets and other self-contained gaming tickets. More particularly, a multiple play ticket is disclosed which, in the preferred embodiment, is protected from fraud through the use of unique validation codes which are not merely a representation of the ticket's gaming indicia. A validator machine is also disclosed which, in conjunction with a host computer, can validate a player's ticket, display each of the plays on a monitor or stepper reel and issue redeemable vouchers for winning tickets. The gaming tickets of the present invention can either provide fixed payouts or be used in connection with a progressive jackpot.

BACKGROUND OF THE INVENTION

The distribution of gaming tickets, such as "pull-tabs" and "scratcher" lottery tickets, has become an increasingly popular way to allow people to win money or valuable prizes. Typically, a large number of such pull-tab or lottery tickets are printed up by a promoter for distribution to players. Each of these pull-tabs or lottery tickets will have a printed arrangement of indicia on them, such as numbers or fruit symbols, which, under the rules of the game, will correspond to either winning or losing combinations. Generally, a fewer number of winning tickets will be produced for more valuable prizes and a greater number of winning tickets will be produced for less valuable prizes.

In order to enhance the enjoyment of play and prevent fraud, the indicia on the pull-tab or lottery ticket are normally hidden from view at the time the pull-tab or lottery ticket is distributed. In this way, the player will not initially know whether he has drawn a winning or losing ticket. In order for the player to determine if he has a winning or losing ticket, the player must generally pull away an opaque surface on the ticket to reveal the indicia. In the case of a pull-tab, this opaque surface is typically a paper or cardboard pull-tab cover. In the case of lottery tickets, such as popular "scratcher" tickets, this opaque surface is a latex or gum-like material which can be rubbed off the ticket using the edge of a coin or the player's finger nail.

A continuing concern for pull-tab and lottery promoters is fraud. For example, if a player draws a losing pull-tab, he might be tempted to alter or tamper with that losing pull-tab to make it look like a winning pull-tab and then try to redeem it as a winning pull-tab. To deter such fraud, validation codes which are not readily decipherable to the player, such as bar codes, have been placed upon the outside of pull-tabs. In many cases, these validation codes simply identify, in code form, the combination of indicia inside the pull-tab so that if those indicia are altered, the fraud can be easily exposed. Unfortunately, once a player is able to recognize which validation codes correspond to winning pull-tab tickets, particularly a player who can choose from among a stack of pull-tabs, the player might pick for himself only pull-tabs with winning validation codes.

In order to increase the convenience and enjoyment of pull-tab games, pull-tab dispensing and display machines have been developed. One such pull-tab dispensing and display machine is shown in Clapper's U.S. Pat. No. 5,377,975. In the Clapper machine, a roll of two-ply pull-tab strips is stored, with each pull-tab ply having an identical set of pull-tab indicia. Upon actuation of the Clapper machine by insertion of the player's money, the two plies of the pull-tab strip are internally separated with one of the plies being dispensed open-faced to the player and the other ply being kept by the machine for use in displaying the indicia on a monitor and for record keeping purposes.

While the Clapper machine adds a certain degree of interest and convenience to the pull-tab game, it nonetheless has several disadvantages. First of all, since an open-faced pull-tab is dispensed by the Clapper machine and simultaneously displayed, the Clapper machine is classified as an unacceptable gambling machine in many jurisdictions. In the eyes of these jurisdictions, the Clapper pull-tab machine is little more than a video slot machine which simultaneously dispenses a written representation of the video display.

Another disadvantage of the Clapper machine, and of nearly all other existing pull-tab and lottery ticket systems, is that there is only one play per ticket. In a business where it is important to both maximize profits and, at the same time, the returns received by the player, the cost of printing pull-tabs becomes a significant concern. The higher the pull-tab printing costs are, the less money there is to distribute in profits to the pull-tab promoter and winnings to the player.

SUMMARY OF THE INVENTION

The present invention provides a multiple play gaming ticket, such as a pull-tab or lottery ticket, and a secure validation system. In its preferred form, the gaming ticket of the present invention is a pull-tab formed of two sheets of a cardboard like material with a peel away section formed in one of the sheets. When the peel away section is peeled away, a unique validation code and multiple plays of arrayed indicia are exposed. In one form of such a pull-tab, the validation code is a unique bar code and the multiple plays are twenty sets of single digit numbers each arrayed in three rows and three columns. In this embodiment, if there are matching numbers along any horizontal, vertical or diagonal line of an array, the play is a winning play.

In its preferred form, the validation system of the present invention includes a combination of a computerized validator machine and a host computer. To operate the validation machine, the player preferably inserts an opened pull-tab into the pull-tab slot. The validation machine then reads the validation code and relays the validation code to a host computer. In the preferred embodiment, there is a unique validation code for every pull-tab which does not merely encode the pull-tab indicia. At the host computer, the unique pull-tab validation code is checked for legitimacy (i.e., proper form and availability) and then correlated to a stored record of gaming indicia for that pull-tab. If the code is validated by the host computer, the host computer sends its approval back to the validation machine along with an electronic record of all the plays for that particular pull-tab. The player is then given the option of having the plays sequentially displayed on the validator monitor or of immediately cashing out. As part of a game display, the validator monitor will show which indicia combinations create winning plays and keep track of accumulated winnings. At the conclusion of play, a voucher will automatically be printed out by the validator which can then be redeemed.

The gaming ticket of the present invention can be used in connection with fixed payouts, progressive jackpots or both. In the case of fixed payouts, the value of a winning combination is predetermined and is typically printed on a payout table found on the outside of the gaming ticket or on the validation machine. Alternatively, the gaming ticket of the present invention can be used to win some or all of a progressive jackpot which continues to increase until claimed by a winner. To add interest, the validation machines at one location can be linked with validation machines at other locations to allow players to compete for large progressive jackpots. In a further embodiment, the validation machines of the present invention can be configured to allow the player to employ gaming skills, such as selecting gaming ticket symbols to be replaced or "respun" before a final determination is made about whether the player has won or lost. This "respin" feature can also be implemented as part of the gaming ticket itself.

DESCRIPTION OF THE SPECIFIC EMBODIMENTS

Figure 1A:
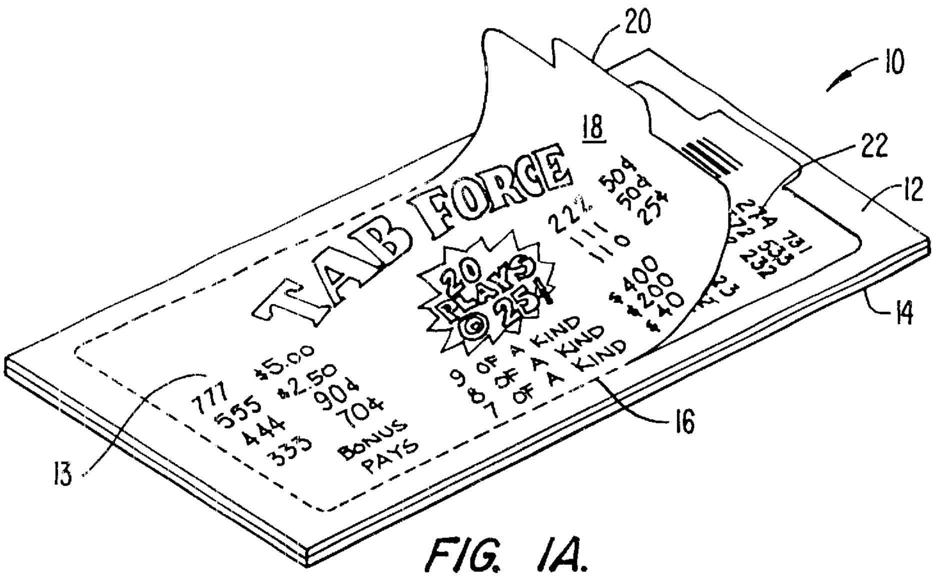
FIG. 1A shows a perspective view of a partially opened pull-tab of the resent invention.

The invention includes both a secure, multiple play gaming ticket and a coordinating system of validation machines. Referring now to FIG. 1A, a preferred form of gaming ticket in the form of a pull-tab 10 is shown. This pull-tab 10 is preferably formed of two sheets 12, 14 of an opaque paper or cardboard-like material which are joined together along their edges with a suitable adhesive, such as rubber cement or other paper glue. On the outside of one of the sheets 12, a payout table 13 is preferably shown which illustrates combinations of indicia that would be considered winning combinations and how much each of these winning combinations would win. When the pull-tab of the present invention is used in a progressive jackpot game, the value of a jackpot win will typically be changing on a continuing basis and preferably displayed on one or more jackpot display signs located close to the validation machine, such as jackpot display signs 144, 148, 164, 168 shown in FIG. 7. Returning to FIG. 1A, perforations 16 are punched into the top sheet 12 of pull-tab 10 so as to create a peel-away section 18 on the top sheet 12. To play the game, the player grips the tab 20 of the peel-away section 18 and pulls the peel-away section 18 back from the remainder of the pull-tab 10.

Gaming tickets 10 for use with the present invention may alternatively be formed in any number of other ways which are known to those of skill in the art. For example, instead of having a peel-away section 18 covering the playing indicia 22, an opaque latex or gum may be used to cover the playing indicia 22 as is now done on "scratcher" games. The important objective is to cover the playing indicia 22 from view until the ticket has been distributed and placed in the hands of the player. The player should then be able to easily remove the opaque covering to determine whether or not he has a winning ticket.

Figure 1B:
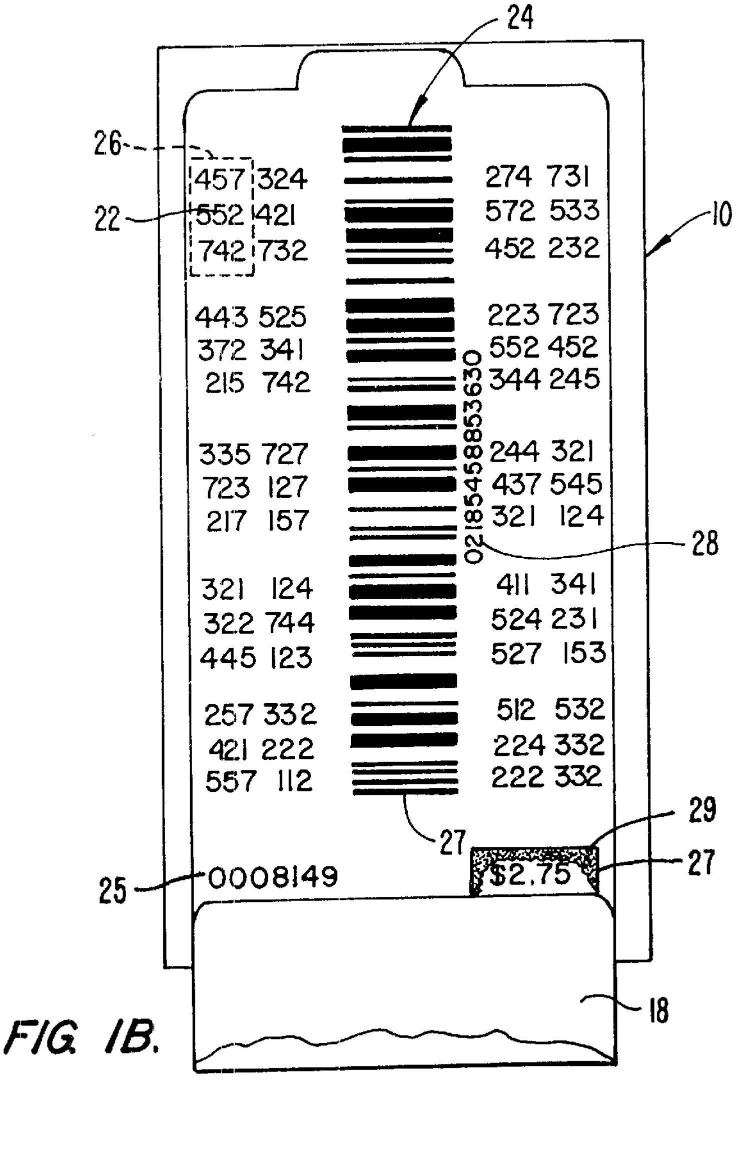
FIG. 1B shows a plan view of the inside of an opened pull-tab of the resent invention with the displayed indicia and unique bar code.

FIG 1B shows the inside of a preferred form of pull-tab 10. In this preferred form of pull-tab 10, the playing indicia 22 are in the form of single digit numbers arrayed in rows and columns on each side of a validation bar code 24. Each play 26 would consist of 3 rows and 3 columns of such single digit numbers. In the pull-tab ticket 10 shown in FIG. 1B, there are twenty such plays 26. As is known in the art, a variety of other types of indicia 22 can be used in place of the single digit numbers shown in FIG. 1B including fruit indicia, such as cherries, plums and oranges, as well as non-fruit indicia, such as bells, bars and sevens. Such indicia 22 can also be arrayed in a wide variety of ways, including in different numbers of columns and rows. Moreover, it is not necessary that twenty plays be put on each pull-tab ticket 10. Nonetheless, to reduce printing costs and thereby increase player returns and promoter profits, it is preferable to have multiple plays on each ticket 10.

Determining which of the pull-tab plays 26 are winning plays can be done in a variety of ways. For example, having all the same numbers on any horizontal, vertical or diagonal line can be used to create a winning play in a manner analogous to an "8-liner" slot machine. Alternatively, a pull-tab promoter might require all of the numbers in an entire play 26 to be the same before making that a winning play. Since finding a play with all the numbers being the same is usually rare, such a requirement might be made only for well rewarded winning plays. For less well rewarded winning plays, the pull-tab promoter may only require that a certain number, such as a "1", be found within the play, regardless of the remaining numbers. In the preferred embodiment, a mixture of criteria is used to determine winning plays so that winning plays with smaller rewards are fairly frequently achieved in order to maintain player interest while winning plays with large rewards are infrequently achieved in order to allow the promoter to have a reasonable profit.

A validation code 24 is preferably found within the pull-tab 10 and is a unique code which does not merely encode the playing indicia 22. In a preferred form of the invention, the validation code 24 is a bar code 27 representing a corresponding 14 digit sequence 28 which is also printed on the pull-tab 10 next to the bar code 26. The first seven digits of this validation code sequence 28 preferably identify the batch from which the pull-tab 10 came. The next six digits preferably identify the number of the specific pull-tab 10 within that batch. The last digit represents a checksum of the other 13 digits. To further improve game security, this 14 digit validation code can be encrypted with an encryption algorithm using a randomly generated encryption number so that someone cannot identify the batch and specific pull-tab numbers from simply reading the validation code number 28, unless they have access to the encryption key.

It should be noted that the use of a unique validation code 24 for each pull-tab 10, one which does not merely encode the playing indicia 22, has several advantages. First of all, a code which tries to capture all the information in multiple game plays would be very long and may not fit into the limited area of the pull-tab 10. Second, by detecting unique code during the validation process, the pull-tab promoter can exactly identify the pull-tab 10 which is being validated and immediately detect a copy, counterfeit or reuse of a previously issued pull-tab. This exact identification also allows the promoter to keep track of the play for all of the pull-tabs in a particular batch through the use of accounting software. Finally, the unique validation code 24 prevents players or promoters from using their knowledge of the bar code from a previous winning pull-tab to pick and choose from among newly issued pull-tabs to select only the winning pull-tabs.

While use of an internally-placed validation code 24 in the form of a unique bar code 27 and numeric translation 28 is the preferred embodiment, those of skill in the art will recognize that many other sorts of validation code placements and unique validation codes 24 can be used. For example, if the validation code 27 is encrypted, it could easily be placed on the outside of the pull-tab 10 with minimal loss of security. Also, when there are fewer game plays 26 per pull-tab ticket 10, the validation code 24 could uniquely encode both the origin of the pull-tab 10 and the contents of the pull-tab games 10.

In the preferred embodiment, pull-tab 10 further includes a unique serial number 25 to unambiguously identify the lot to which the pull-tab 10 is associated. These serial numbers 25 will allow the promoter or on-site operator to make a spot check of the pull-tabs without having to run each pull-tab being checked through a validation machine 30. If desired, a box 27 can also be provided on the pull-tab 10 with a total of any winnings for that pull-tab ticket 10. This box can be used to quickly apprise the player of whether or not the pull-tab represents a winning ticket. For those pull-tabs 10 which are not winning tickets, the player may chose to avoid any further validation procedures. To add interest, the total winnings in this box 27 can be hidden with a latex or gum-like material 29 or other suitable cover so that the player will be left in suspense as to whether or not the ticket is a winning ticket until the player either chooses to place the ticket in a validation machine 30 or removes the material 29 which is used to hide the total winnings.

Figure 2:
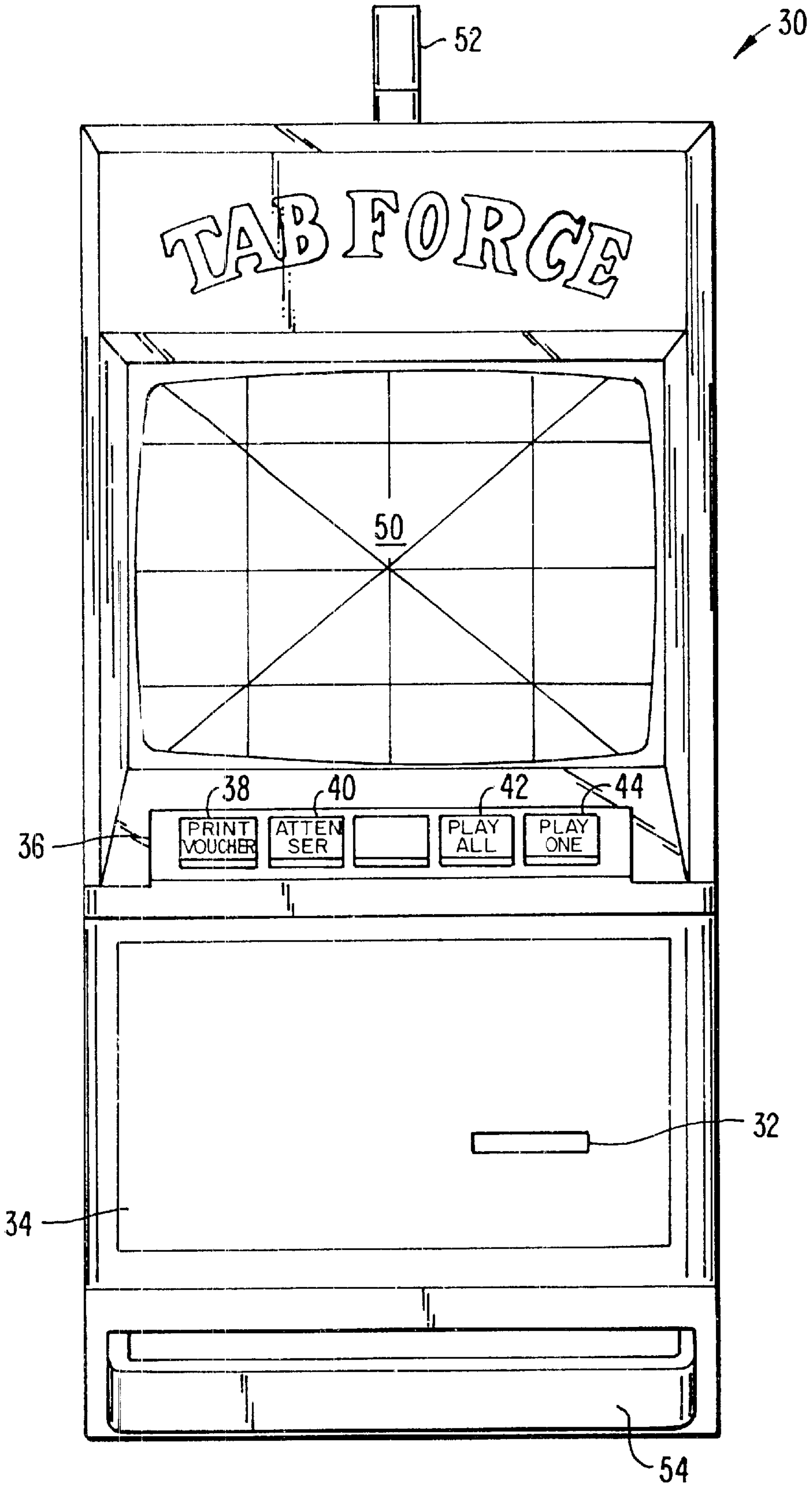
FIG. 2 shows a front view of a preferred form of pull-tab validator machine of the present invention.
Figure 5:
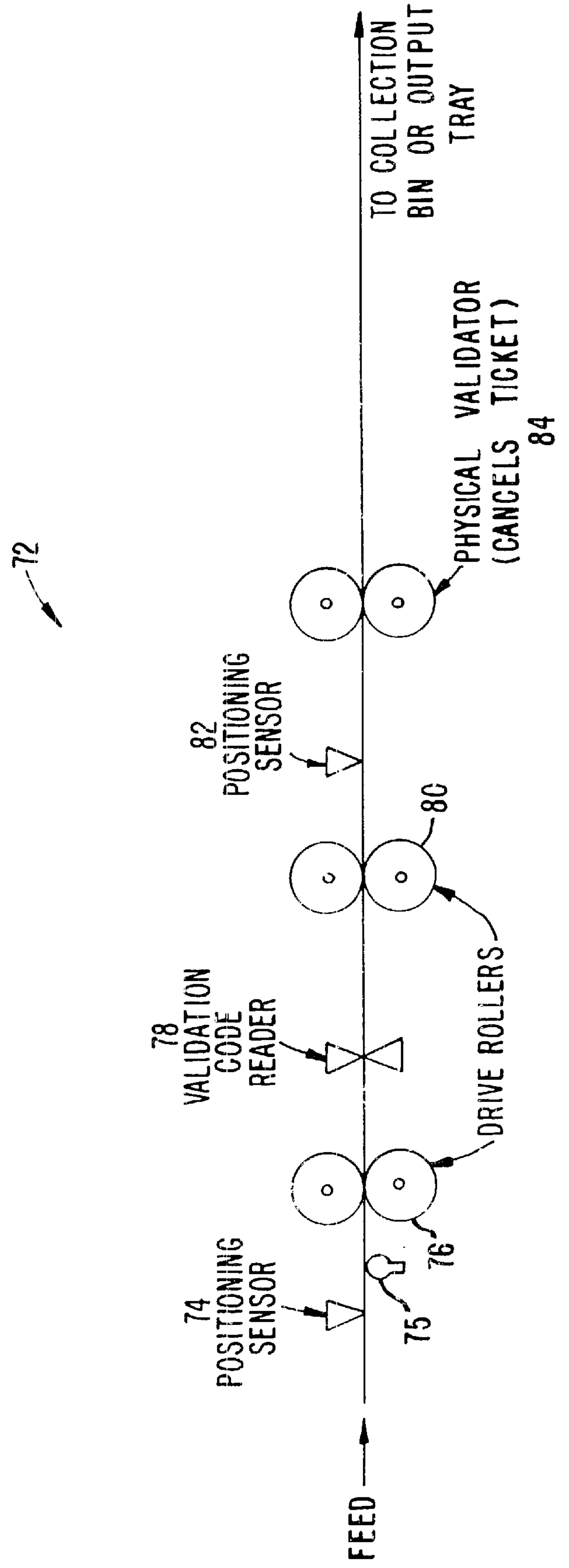
FIG. 5 schematically illustrates the pull-tab feed, processing and sensing mechanism for the pull-tab validator machine of the present invention.

Turning now to FIG. 2, an electronic validator machine 30 for use with the pull-tabs 10 of the present invention is shown. The purpose of this electronic validator 30 is to accept pull-tabs 10, determine whether the pull-tabs 10 are legitimate and effectuate the results of game play. To accomplish these purposes, pull-tab acceptor slot 32 is provided on the validator console 34. The pull-tabs 10 are preferably inserted into this slot 32 after they have already been opened by the player. In an alternative embodiment of the invention, the pull-tab 10 can be inserted into the pull-tab acceptor slot 32 in unopened form. In this alternative embodiment, a validation code 24 would either have to be printed on the outside of the pull-tab 10, readable through the opaque sheets 12, 14 of the pull-tab or a mechanism would need to be incorporated into the pull-tab validator 30 which removes the peel-away tab 18, such as the thumper 75 shown in FIG. 5.

The pull-tab validator 30 preferably includes a panel of buttons 36 to facilitate its use. Among these buttons is a "PRINT VOUCHER" button 38 which allows the player or other validator user to, at any time, have a redeemable voucher printed out which summarizes the results of game play. While a voucher will normally be automatically issued at the end of game play, this "PRINT VOUCHER" button allows the player to curtail game play at any point and have the voucher issued immediately. The information on this voucher preferably includes at least some validator identification information (e.g., terminal number, location name and address), the time and date of game play, the validation code 24 and the amount of the player's winnings. In an alternative embodiment, this voucher could show the indicia 22 from all the plays 26 on the pull-tab ticket 10. In another alternative embodiment, which achieves essentially the same objective, the voucher identification information (e.g., terminal number, location name and address) could be printed on the pull-tab ticket 10 itself by the pull-tab validator 30, thus eliminating the need for an additional voucher document.

An "ATTENDANT SERVICE" button 40 is provided to allow the player to summon an attendant in the case of validator malfunction or other need for assistance. "PLAY ALL" 42 and "PLAY ONE" 44 buttons are provided to allow the player to have the various plays on the pull-tab ticket either skipped or individually displayed on the video monitor 50. The "PLAY ALL" button directs the validator 30 to either skip or rapidly display all of the individual plays on the pull-tab 10. By contrast, the "PLAY ONE" button permits the player to display the game plays 26 one at a time. In order to increase player enjoyment of the pull-tab game, the plays are preferably displayed in random order rather than in the sequence they are presented on the pull-tab ticket 10.

While, in the preferred embodiment, the panel of buttons 36 is shown as being part of the validator console 34, the panel of buttons 36 could also be incorporated into a "touch screen" form of monitor 50. Suitable touch screens for use with the present invention include the TRUEPOINT™ capacitive sensing screen produced by MicroTouch Systems, Inc. of Methuen, Mass. and the INTELLITOUCH acoustic wave sensing screen produced by ELO Touchsystems of Oak Ridge, Tenn. Using such a touch screen monitor 50, the player can activate the buttons 36 of his choosing by simply touching the appropriate area of the touch screen monitor 50.

At the top of the validator unit 30, a lamp 52 is provided. This lamp 52 can be used to help summon an attendant when the "ATTENDANT SERVICE" button 40 is pressed or, with coordinating sound effects, create a festive display when a winning play is shown. At the bottom of the validator 30 is a tray 54 which can be used to dispense printed vouchers to the player at the end of game play. This tray 54 can also be used to return pull-tab tickets 10. As an alternative, such pull tab tickets 10 could be returned through the pull-tab acceptor slot 32 into which they were inserted.

Figure 3A:
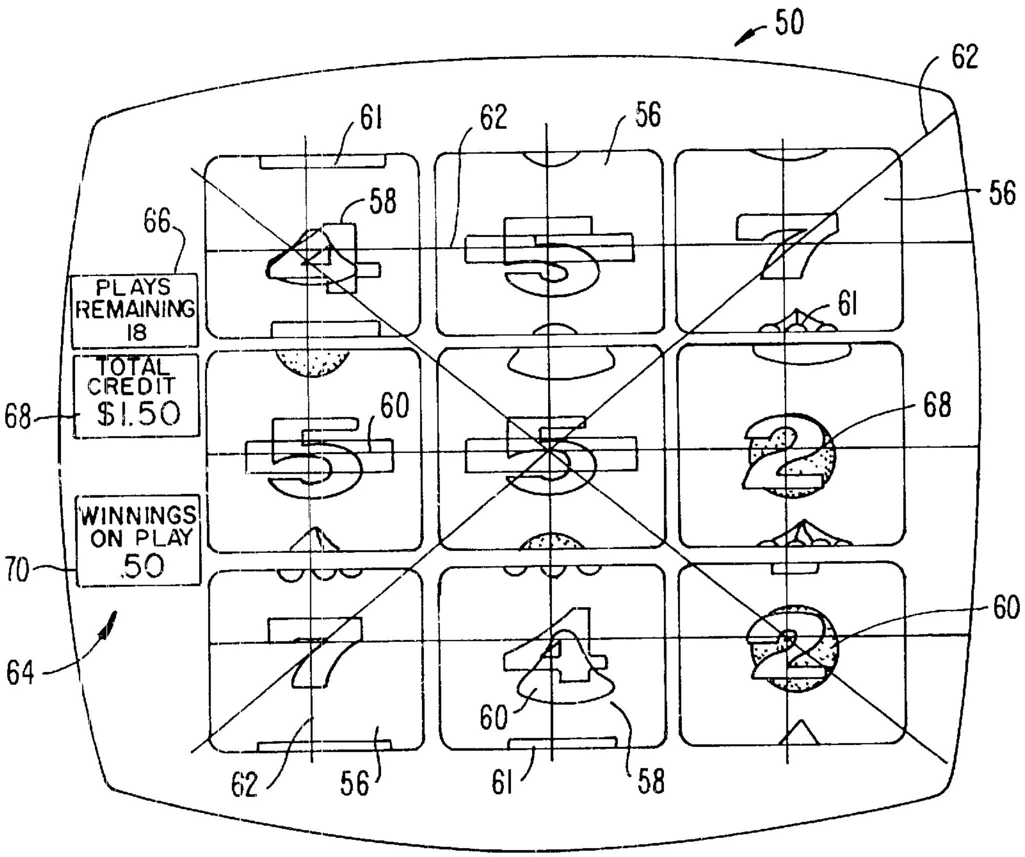
FIG. 3A shows a close-up front view of the pull-tab validator machine monitor of the present invention with displayed indicia from a typical game play.
Figure 3B:
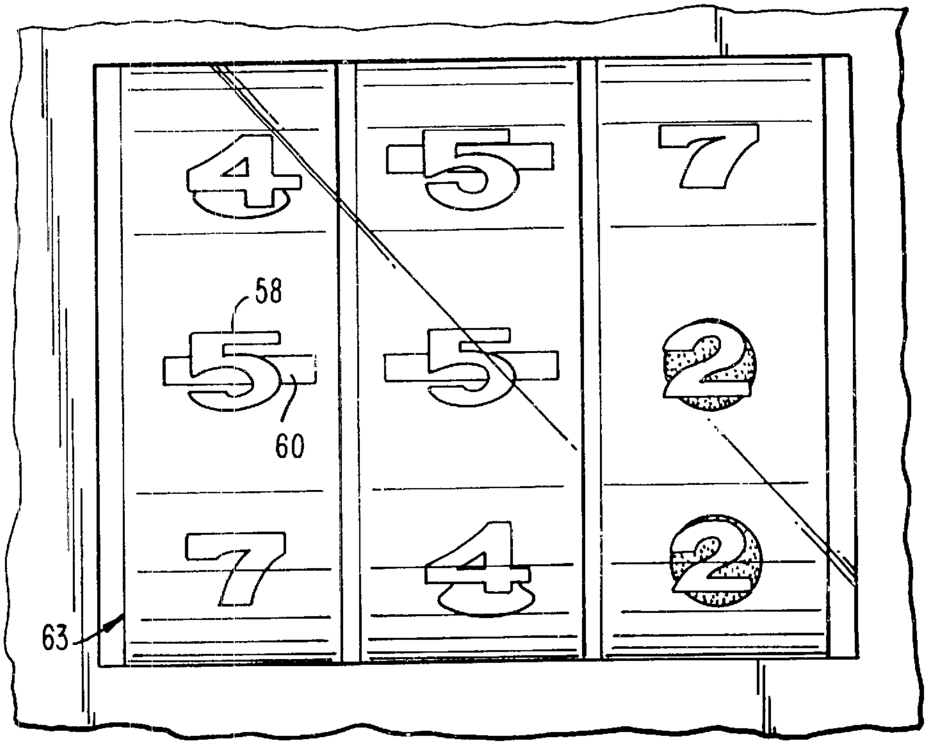
FIG. 3B shows a close-up front view of a stepper reel pull-tab validator embodiment which constitutes an alternative way of displaying indicia from a typical game play.

A close-up view of the validator monitor 50 is shown in FIG. 3 with the display of a typical game play. In this example of a game play display, nine display boxes 56 are arrayed in three rows and three columns. In the middle of each of these display boxes 56, a composite symbol 58 is shown. This composite symbol 58 corresponds to the indicia 22 on the pull-tab for the particular pull-tab play 26 which is currently being played. For example, if a "4" is shown in the upper left hand corner of the pull-tab play 26 being displayed (FIG. 1B), a "4" would also appear in the upper left hand display box 56 on the monitor 50 while that play is being shown. To provide further interest for the player, the single digit indicia 22 from the pull-tab ticket 10 can be superimposed over a popular color gaming symbol 60 which is assigned to that number, such as an orange, plum, cherry or bar, to create the composite symbols 58 shown in FIG. 3. Also, half-symbols 61 can be added at the top and bottom of each display box 56 to make the display appear similar to that of a slot machine.

While a validator machine 30 with an electronic display has thus far been described to illustrate the principles of the present invention, those of skill in the art will readily recognize that a more mechanical machine could alternatively be used to display gaming results. For example, rather than generating video displays on monitor 50, the type of mechanical stepper reels 63 (FIG. 3B) which are in common use in slot machines could be used instead to display gaming results. In the case of such mechanical stepper reels, the stepper reels could be put into motion during play and directed to stop at positions corresponding to the final composite symbols 58 at the end of play.

In the preferred embodiment, the gaming ticket 10 can be used in either an electronic validator machine 30 or a stepper reel validator machine. In this preferred embodiment, both types of validator machines will process the gaming ticket in exactly the same way with the only difference being the type of display. In an alternative embodiment, the gaming ticket 10 is provided with two sets of symbols, one set for use by an electronic validator machine 30 and the other set for use by a stepper reel validator machine. In the gaming ticket example shown in FIG. 1B, the game plays 26 to the left of the bar code 24 could be used for the electronic validator machine in this embodiment and the game plays 26 to the right of the bar code 24 could be used for the stepper reel validator machine. While different sets of symbols are used in this embodiment for different types of validator machines, it is preferred that the total winnings for a gaming ticket 10 be the same regardless of what type of validation machine is used.

If a particular combination of composite symbols 58 on the monitor creates a winning combination, this can be shown on the monitor in a variety of ways. For example, each of the symbols in the winning combination can be lit up or, in the case where winning combinations are formed on horizontal, vertical or diagonal lines, a line 62 can be created on the monitor which connects the winning symbols. At the time a winning combination is shown on the monitor 50, the lamp 52 (FIG. 2) can be lit and pleasing sounds can be made to emanate from the validator 30 to increase the player's enjoyment of his winning combination.

To assist the player in keeping track of the progress of his game play, a series of information boxes 64 can be provided on the monitor. In the preferred embodiment, a "PLAYS REMAINING" information box 66 tells the player how many plays remain to be displayed from his pull-tab ticket 10, a "TOTAL CREDIT" information box 68 tells the player the total of his winnings from the pull-tab ticket 10 being displayed and a "WINNINGS ON PLAY" information box 70 tells the player what amount of winnings are generated from the particular play being displayed at that time. If desired, both the number and other identifying features of the pull-tab 10 could also be displayed on the monitor 50 as part of the information boxes 64.

Figure 4:
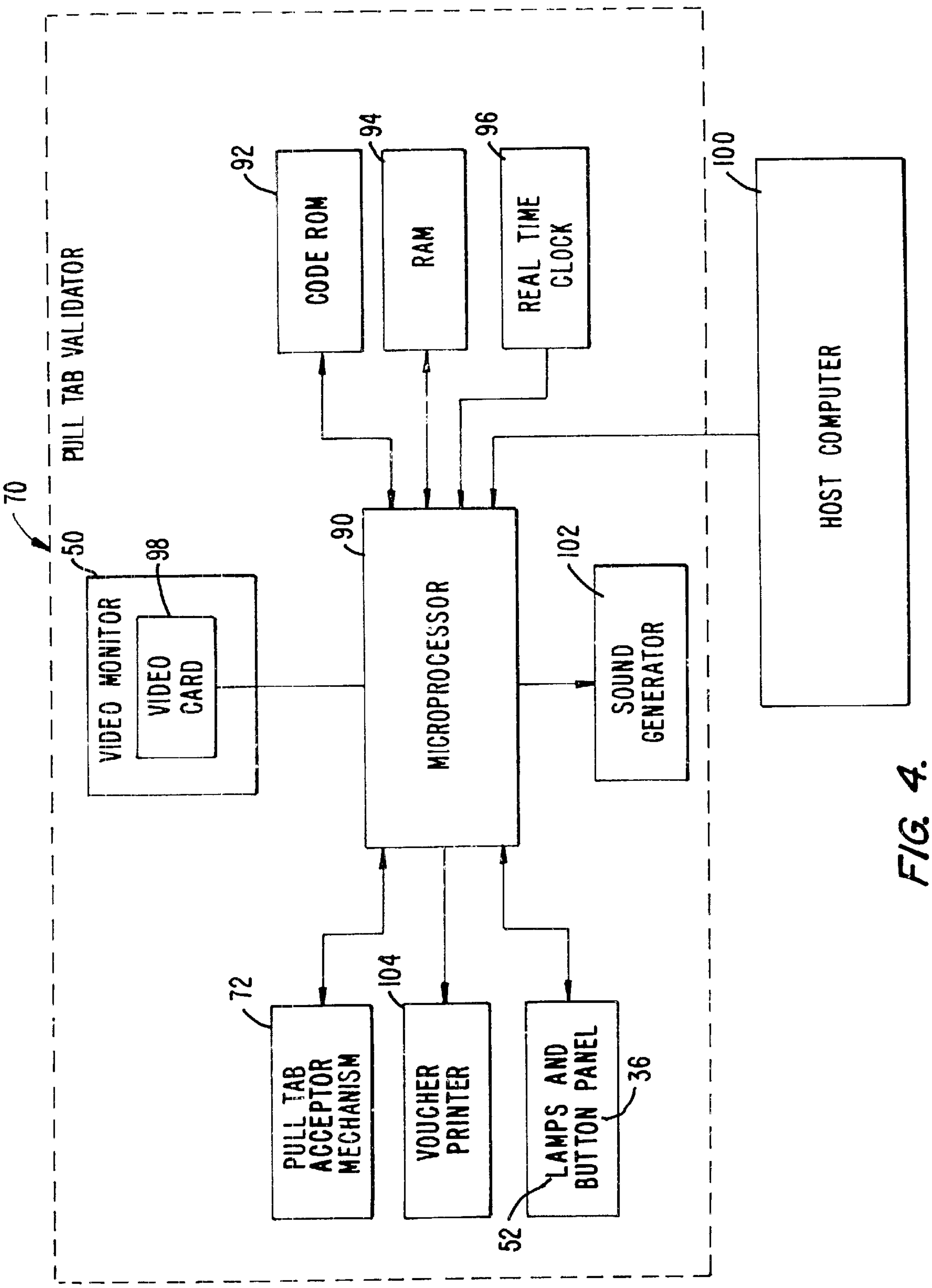
FIG. 4 is a block diagram which schematically shows the control system for the pull-tab validator machine of the present invention and its interaction with a host computer.

In the preferred embodiment, the validator 30 of the present invention is controlled by validator computer circuitry 70 which is schematically illustrated in FIG. 4. Operation of this validator computer circuitry 70 begins with insertion of a pull-tab 10 into the pull-tab acceptor mechanism 72. The operation of this pull-tab acceptor mechanism 72 is shown in further detail in FIG. 5. After the pull-tab ticket 10 is fed into the pull-tab acceptor slot 32 (FIG. 2), its presence and orientation is sensed by positioning sensor 74 and relayed to the microprocessor 90. If the pull-tab 10 is in an appropriate position, the microprocessor 90 will activate the drive rollers 76 to advance the pull-tab 10 and allow its validation code 24 to be read by validation code reader 78. Where the validation code 24 is a printed bar code 27 which is placed on the outside of the pull-tab ticket 10 or made visible through use of an opened pull-tab ticket in the validator 30, the validation code reader 78 would typically be an optical character reader.

Alternatively, where the inserted validation code 24 is not visible when placed under the validation code reader, other types of validation code 24 printing and validator code readers can be used to still allow the validation code to be read. For example, the validation code 24 could be printed on the inside of the pull-tab card 10 with a metallic ink and then sensed with a validation code reader 78 which uses x-rays. Similarly, the validation code 24 could be printed on the inside of the pull-tab ticket with an infrared detectable ink and be read with an infrared validation code reader 78.

The information obtained by the validation code reader 78 is then passed back to the microprocessor 90 for analysis (FIG. 4). If the pull-tab ticket 10 is determined to be legitimate, it is forwarded by driver rollers 80 past positioning sensor 82 to the physical validator 84. At the physical validator 84, this legitimate pull-tab ticket 10 is physically validated, for example by punching holes, and then passed along to the validator collection bin (not shown) for retention by the validator 30. If the pull-tab ticket has been misinserted or should be returned for any other reasons, it can be diverted, without physical validation, to the tray 54 and picked up by the player. In an alternative embodiment, a validated pull-tab ticket 10 can also be diverted to the tray 54 so that it can be retained by the player. By programming the validation code reader 78 to observe and report any physical validation of the pull-tab ticket 10, the validator 30 of the present invention can prevent any pull-tab ticket 10 from being redeemed twice.

Turning again to FIG. 4, the microprocessor 90 makes up the heart of the validator computer circuitry 70. Suitable microprocessors include the Z80 microprocessor manufactured by Zilog, Inc. of Campbell, Calif. and the PENTIUM™ microprocessor manufactured by Intel Corporation of Santa Clara, Calif. The microprocessor 90 relies upon programming instructions stored in code read-only memory (CODE ROM) 92 to execute the game play sequence and create appropriate video displays. The CODE ROM 92 might suitably be a WSIPSD512 chip produced by WaferScale Integration, Inc. of Fremont, Calif. To assist the microprocessor 90 in processing game play information, a random access memory (RAM) 94 and real time clock 96 are preferably provided. The RAM 94 might suitably be a non-volatile 384K RAM chip. A suitable real time clock 96 would be a 2K non-volatile "Dallas Timekeeper" RAM produced by Dallas Semiconductor of Dallas, Tex.

In conjunction with a video card 98, the microprocessor 90 controls the displays on video monitor 50. In the preferred embodiment, the video card 98 contains a symbol graphics erasable, programmable read on memory (EPROM), a static graphics EPROM and a random access memory (RAM). The microprocessor also controls lamps 52, button panel 36, sound generator 102 and voucher printer 104.

Figure 6:
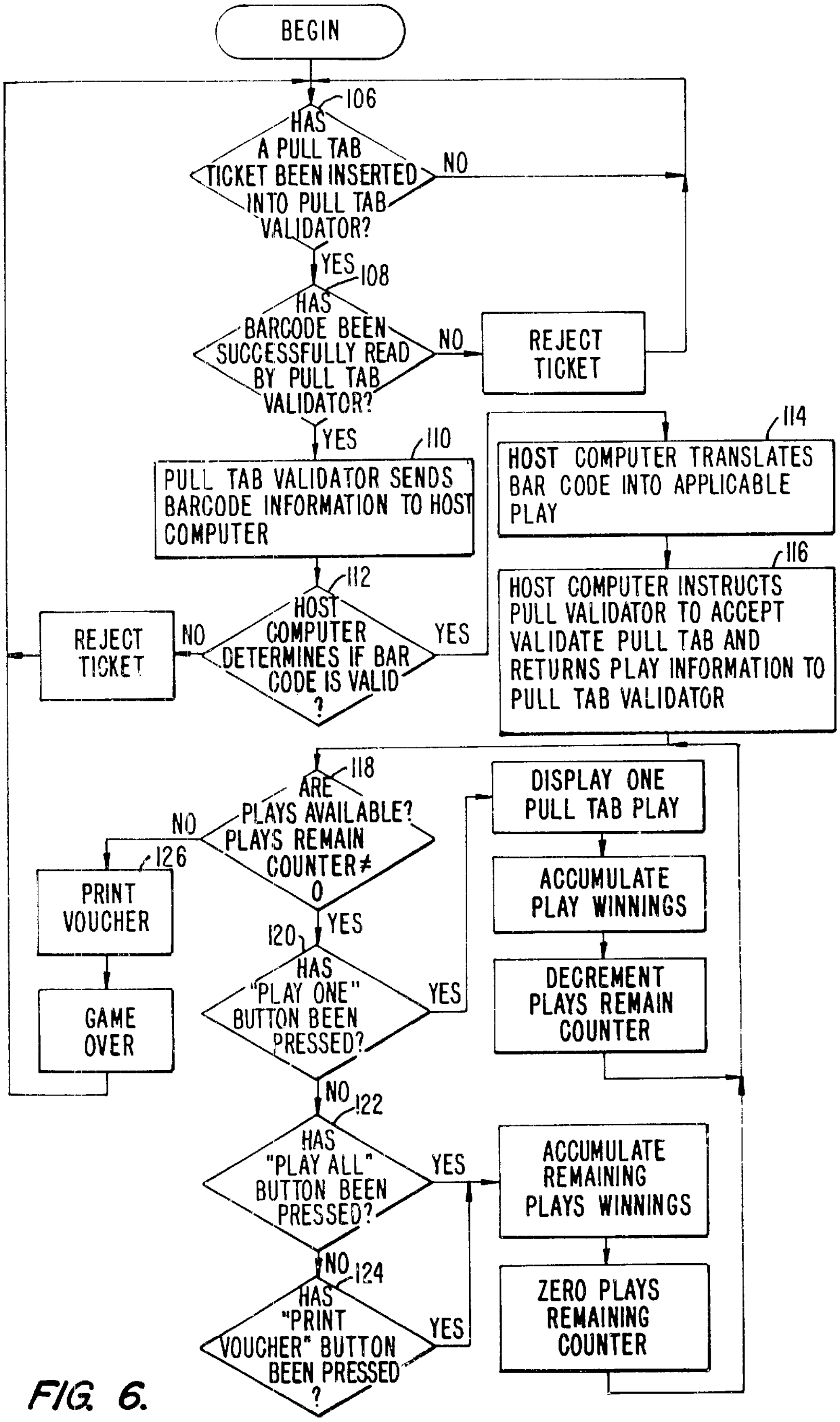
FIG. 6 is a flow chart for the sequence of play using the pull-tab validator machine of the present invention.

For security purposes, the validator microprocessor 90 preferably works in conjunction with a separate host computer 100 to validate pull-tab tickets 10. As shown in the sequence of game play flow chart of FIG. 6, one of the first tasks of the microprocessor 90, after the pull tab ticket has been inserted into the validator 30, 106 and the validation code 24 has been successfully read by the validation code reader 78, 108 is to determine whether that validation code 24 is a legitimate validation code 112. In the preferred embodiment, the validator microprocessor 90 communicates 110 that validation code 24 to a secure host computer 100 which has a list of valid codes and corresponding game plays stored in its memory. If the validation code 24 is encrypted, the host computer 100 will have an encryption key.

When the host computer 100 receives a validation code inquiry from a validator 30, it will compare the communicated validation code 24 against its list of validation codes to determine, among other things, whether the communicated validation code 24 is in proper form and whether it corresponds to a pull-tab ticket 10 that is available for play 112 (e.g., not previously used). If the validation code 24 is determined by the host computer 100 to be legitimate, the host computer 100 will retrieve the game play information 114 corresponding to that validation code 24 from its memory and store pertinent information about the player's use of the particular pull-tab 10 (e.g., date, time, identification of validator, authorized winnings etc.). By collecting information from these validation checks, the host computer 100 can closely monitor pull-tab usage. The host computer 100 will conclude its validation check for legitimate pull-tabs by sending an electronic summary of the pull-tab game plays 26 to the validator 30 along with instructions to accept the pull-tab card 116. If the host computer determines that a validation code 24 is not legitimate, it will instruct the validator 30 to end the game and, where appropriate, notify the promoter that an attempt has been made to redeem an illegitimate pull-tab ticket 10.

While use of a host computer 100 to assist in the validation process is preferred in order to allow a centralized collection of game play information and enhance security, those of skill in the art will readily recognize that the entire validation process can be done within the confines of the validator 30 itself. In this alternative embodiment, lists of active pull tab validation codes 24 and corresponding game play information can be periodically loaded into the validator RAM 94 to allow the validator microprocessor 90 to independently perform its own validation checks. As another alternative, game play information could be incorporated into the validation code 24 to allow the validator microprocessor 90 to perform game play without needing to continually have its RAM 94 updated with information about active validation codes 24.

Regardless of whether the validator 30 acts alone or in conjunction with a host computer 100, it is preferred that the validator 30 store in its RAM 94 various information about game play. This information might advantageously include information about dates and times of game play, the validation codes of inserted pull-tabs, episodes of any rejected pull-tabs and a tabulation of authorized winnings.

When the host computer 100 communicates that a validation code 24 has been approved 116, the validator 30 allows the player to choose whether he wants to play one game at a time by pressing the "PLAY ONE" button 44, 120, whether he wants the games skipped or played all at once by pressing the "PLAY ALL" button 42, 122 or whether he wants a voucher immediately printed out by pressing the "PRINT VOUCHER" button 38, 124. In the preferred embodiment, the availability of these options is communicated to the player after validation has occurred by having the microprocessor 90 light up the "PLAY ONE" 44, "PLAY ALL" 42 and "PRINT VOUCHER" 38 buttons.

At the conclusion of the game, a voucher will automatically be printed 126 and provided to the player through the output tray 54. The player can then present this voucher to the promoter to collect any winnings specified on the voucher. Before determining that the game is concluded and a voucher should be issued, the microprocessor 90 will ask whether there are any remaining plays available 118. If the plays remaining counter has reached zero, the microprocessor 90 will conclude that game play is over and authorize issuance of a voucher. In place of a voucher, the validator 30 could, of course, alternatively issue cash winnings or electronically credit a player's credit card which has been inserted into the validator.

The pull-tab gaming ticket 10 of the present invention can be used in fixed payout games, progressive jackpot games or both. As previously noted, the payout table 13 shown on the tab 20 in FIG. 1A is suitable for a fixed payout game where the player wins the predetermined amounts shown on the payout table 13 if any of the winning combinations displayed are found on the inside of the gaming ticket 10. Recently, players have shown a desire to compete for larger amounts of winnings than can be made possible with a standard table of fixed payouts. To provide for such larger winnings, the gaming ticket 10 of the present invention can also be used in a progressive jackpot game. In such a game, every time a gaming ticket 10 is validated (or alternatively sold), a jackpot amount can be increased by a specified amount, such as $1.00. In cases where there is a smaller local jackpot and a larger linked jackpot, this specified amount can be divided between the two jackpots, such as 40 cents for the local jackpot and 60 cents for the linked jackpot. Alternatively, separate gaming tickets can be purchased for the local and linked jackpot. In this alternative embodiment, only the jackpot to which the ticket corresponds (i.e., either the local or the linked jackpot) will be increased as part of the validation process. Typically, the jackpot(s) will continue to increase until a gaming ticket is redeemed which entitles the player to some or all of the jackpot(s). After such redemption, the player's winnings will then generally be subtracted from the amount of the available jackpot and the jackpot will then continue to accumulate until another winning ticket is redeemed. If desired, some "seed" money can be contributed to the jackpot after a winner has been declared to make sure that the jackpot is always maintained at some predetermined minimum level.

There are a number of different ways that a jackpot can be won. The simplest approach is to create a single gaming ticket combination which will instantly win the entire accumulated jackpot. An alternative approach, which will increase player suspense, is to allow a winning gaming ticket combination to qualify for a jackpot win. A further contest, such as a spinning wheel or other further drawing, could be created to determine how much the qualifier will receive.

A potential problem in using pull-tab tickets for a progressive jackpot game is that the player holding a winning pull-tab may be motivated to delay redeeming that pull-tab until the jackpot has grown to an especially high amount. This strategy of delay can be overcome in the present invention by concealing from the player whether the pull-tab is a jackpot winner until the player has inserted the pull-tab into a validation machine. In that case, the validation machine will simultaneously determine whether the pull-tab is a jackpot winner and determine the amount from the jackpot that the player has won.

Figure 7:
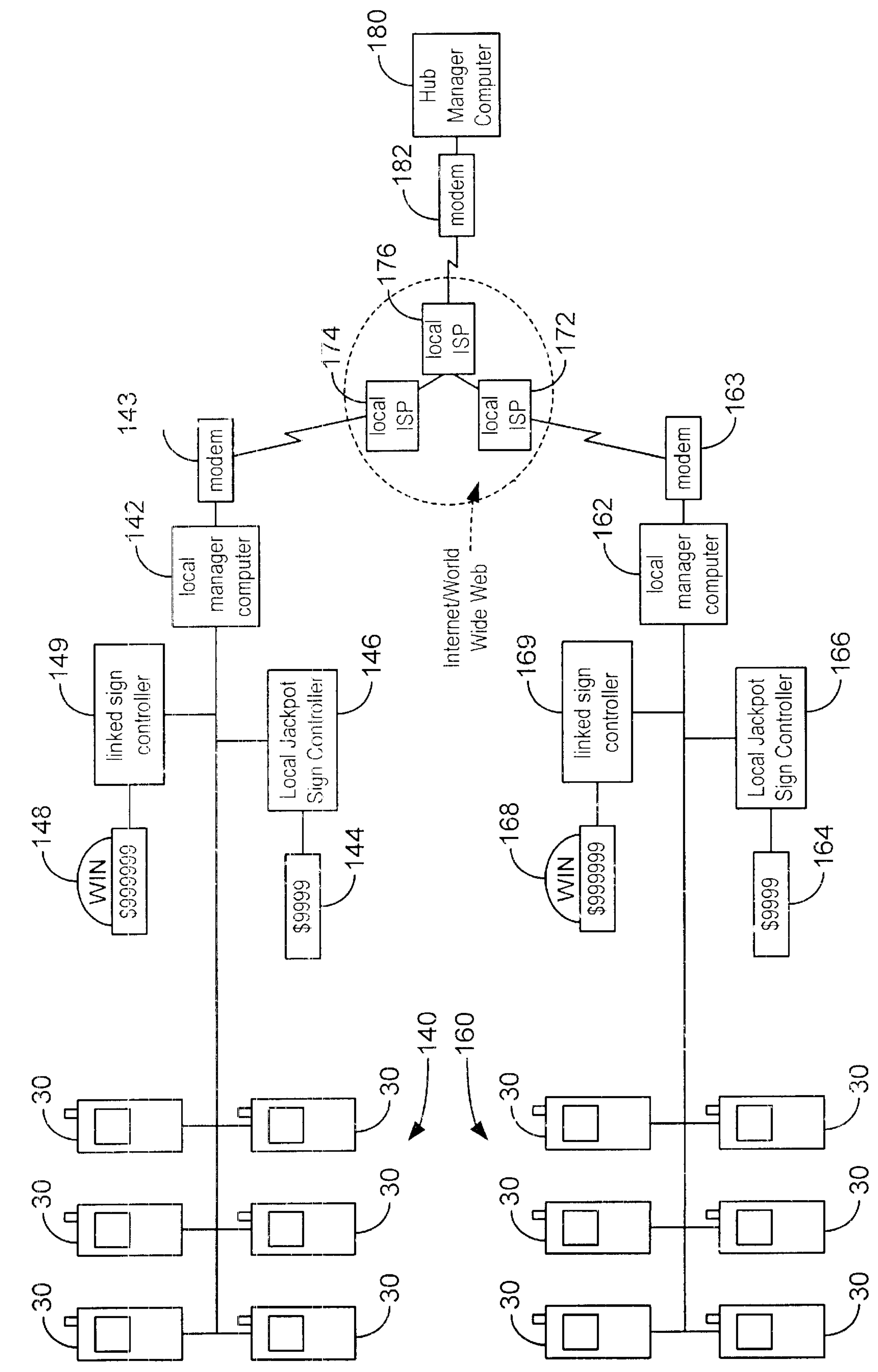
FIG. 7 schematically illustrates a multiple location arrangement of validation machines for use with a progressive jackpot.

FIG. 7 illustrates how validation machines 30 of the present invention can be operated with other components to implement a progressive jackpot system. In the embodiment illustrated in FIG. 7, a plurality of validation machines 30 are electrically connected to a local manager computer 142 at a first gaming location 140. When a pulltab gaming ticket is being validated, the validation machine 30 sends a signal to the local manager computer 142 to allow the appropriate jackpot to increase by a predetermined amount, such as $1.00. In the case where a single ticket is eligible for both local and linked jackpots, this predetermined amount can be apportioned between the two jackpots, as previously noted. The local manager computer 142 can then direct controllers, such as local jackpot sign controller 146 and linked sign controller 149, to increase the amount of their respective jackpots being displayed on signs 144 and 148. If desired, the local manager computer can be programmed to perform the validation functions previously described for host computer 100.

To provide for large jackpots, the validation machines 30 from the first gaming location 140 are linked with validation machines from additional gaming locations 160. Using this linked arrangement, every time a gaming ticket eligible for the linked jackpot is validated (or alternatively sold) at any gaming location, the displayed amount on the linked jackpot sign 148, 168 at all locations is increased. In the linked embodiment illustrated in FIG. 7, the arrangement of validation machines 30, local manager computer 162, jackpot sign controllers 166, 169 and jackpot signs 164, 168 at the second gaming location 160 is the same as the arrangement at the first gaming location 140. In this preferred embodiment, the two gaming locations are linked together through the internet/World Wide Web by having the two local manager computers 142, 162 connected to local internet service providers (ISP) 172, 174 through modems 143, 163. These local manager computer internet service providers 172, 174 are in turn connected to the internet service provider 176 of a hub manager computer 180 through its modem 182.

Through these internet connections, the hub manager computer 180 is informed by the local manger computers 142, 162 each time a gaming ticket eligible for a linked jackpot is validated (or alternatively sold) at their location 140, 160. Upon receiving such information, the hub manager computer 180 will then direct the local manager computers 142, 162 at all locations to increase the amount of jackpot displayed on the linked jackpot signs 148, 168 by a predetermined amount. Also, the local manager computers 142, 162 are used to inform the hub manager computer 180 when some or all of the linked jackpot has been won by a gaming ticket which is validated at their location 140, 160. Upon receiving such information, the hub manager computer 180 directs all local manager computers 142, 162 in the network to reset the linked jackpots in a way which accounts for the amount claimed from the accumulated jackpot. Where the hub manager computer 180 acts as the host computer 100, the hub manager computer 180 can also supervise operation of the local jackpots.

Figure 8:
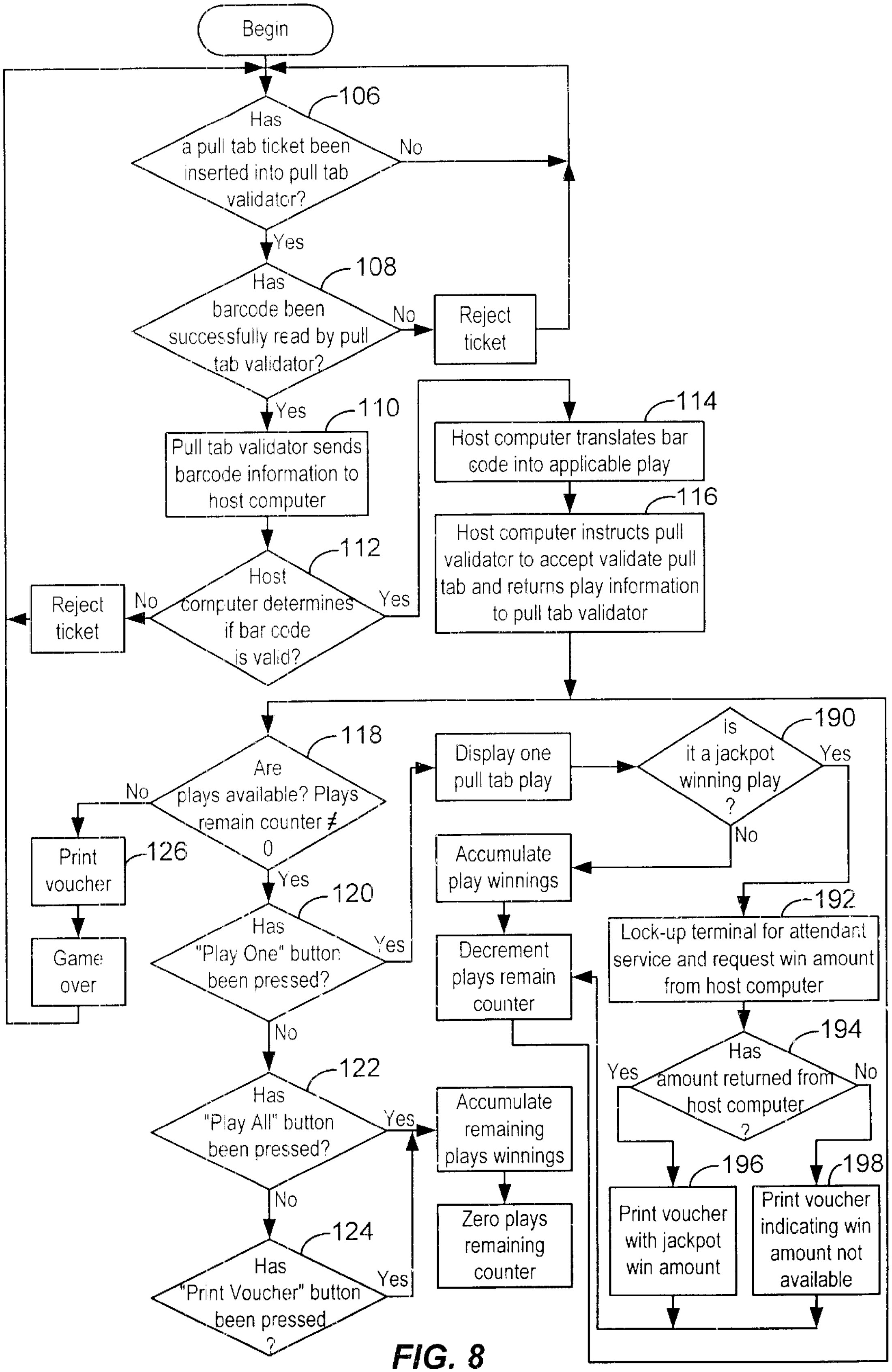
FIG. 8 is a flow chart for the sequence of play which includes additional validation machine logic steps for the progressive jackpot embodiment.

FIG. 8 is a flow chart which illustrates the logic sequence that a validation machine goes through in a progressive jackpot embodiment. Nearly all of the logic steps 106, 108, 110, 112, 114, 116, 118, 120, 122, 124, 126 for this progressive jackpot embodiment are the same as those shown in the FIG. 6 embodiment when the winning amounts are predetermined. The additional jackpot logic steps 190, 192, 194, 196, 198 begin when a pull tab play is run on the validation machine. As part of running this pull tab play, the validation machine will ask whether that pull tab play is a winning jackpot play 190. This jackpot play inquiry can be made of either the hub manager computer 180, the local manager computer 142 or, if appropriately programmed, can be made from the data stored in the validation machine 30 itself. If it is determined that the play is a jackpot winner, the validation machine is preferably locked up 192 while further authorization or processing takes place in the host computer which, in this embodiment, can be either the local manager computer 142 or the hub manager computer 180. When authorization is received 194 from the host computer to payout a jackpot amount, the validation machine preferably prints out 196 a voucher with the amount of the jackpot winnings. If there are problems with receiving this payout amount from the host computer, a voucher will be printed 198 by the validation machine indicating that a jackpot payout amount is not available.

Figure 9:
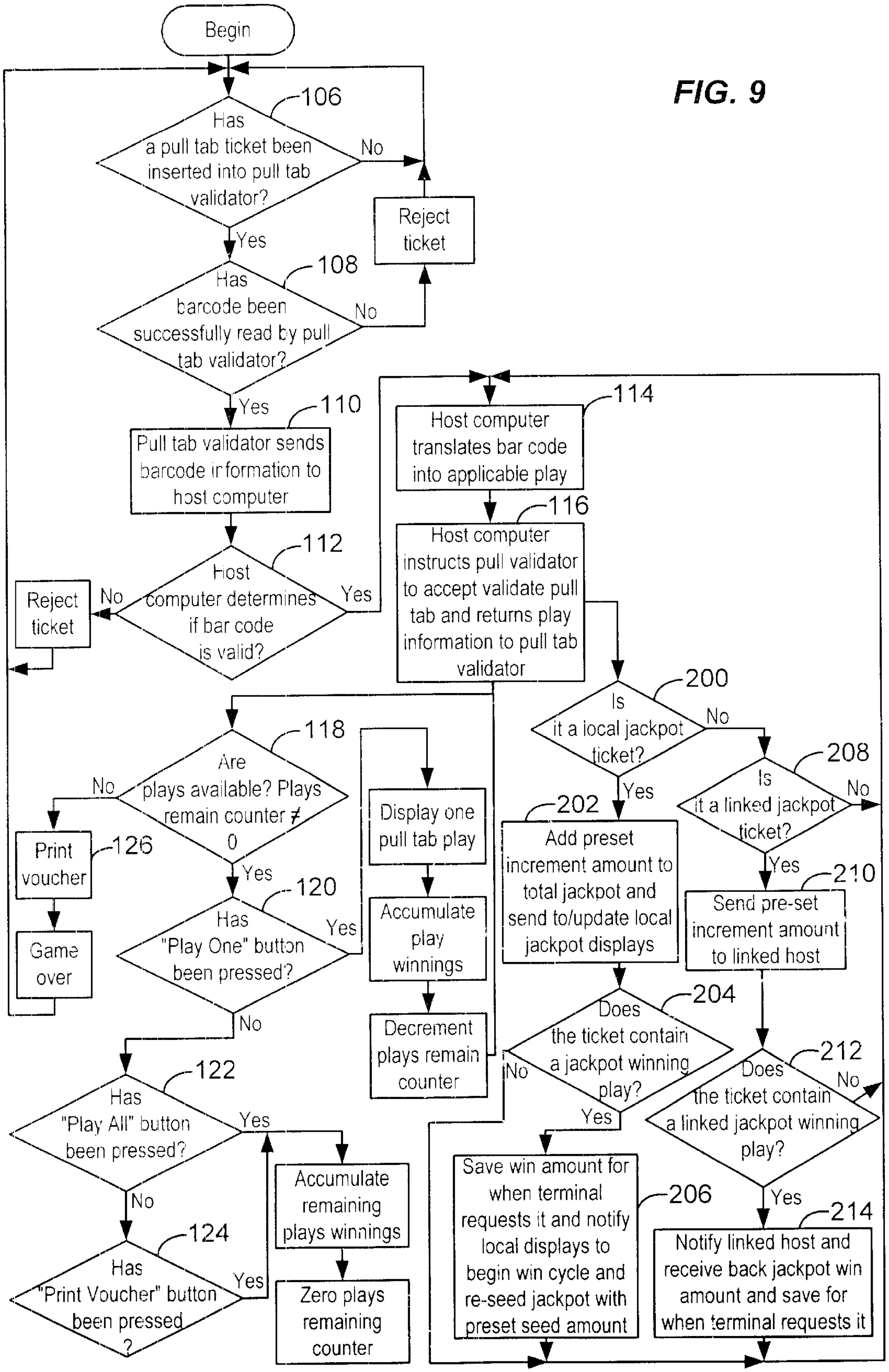
FIG. 9 is a flow chart for the sequence of play which includes additional host computer logic steps for a progressive jackpot embodiment involving both local and linked jackpots.

FIG. 9 is a flow chart which illustrates the additional logic sequence that the host computer goes through in a progressive jackpot embodiment involving both local and linked jackpots. As with FIG. 8, nearly all of the logic steps 106, 108, 110, 112, 114, 116, 118, 120, 122, 124, 126 for this progressive jackpot embodiment are the same as those shown in FIG. 6. The additional jackpot logic steps 200, 202, 204, 206, 208, 210, 212, 214 begin when the validation code is being processed at the host computer. In this embodiment, the host computer will first ask whether the game play is eligible for the local jackpot 200. If it is local jackpot eligible, the host computer will increase the amount of the local jackpot by a preset amount and direct that this increased local jackpot be displayed on the local jackpot signs 144, 164. The host computer will next determine whether the game play is a winner for some or all of the local jackpot 204. If so, the host computer will authorize the applicable validation machine to payout from the local jackpot and direct the local jackpot signs to be reset in view of the payout 206. In this embodiment, the host computer will also ask whether the game play is eligible for the linked jackpot 208. If so, the host computer will increase the amount of the linked jackpot and adjust the linked jackpot displays accordingly 210. As with the local jackpot, the host computer will next determine whether the game play is a winner for some or all of the linked jackpot 212. If so, the host computer will authorize a payout 214 and direct a downward adjustment of the linked jackpot displays.

Figure 10A:
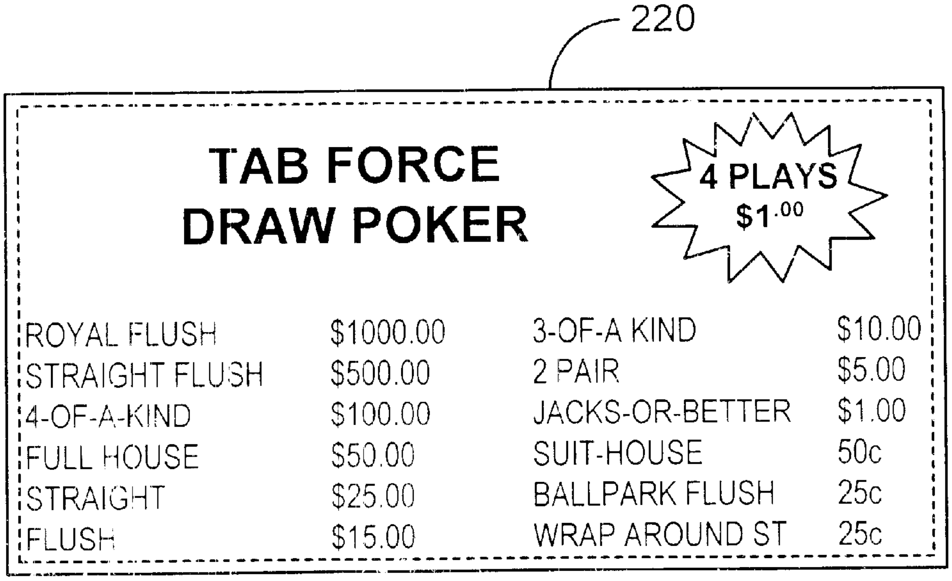
FIG. 10A shows an alternative form of pull-tab gaming ticket which uses poker symbols and provides an opportunity for replacing selected symbols.
Figure 10B:
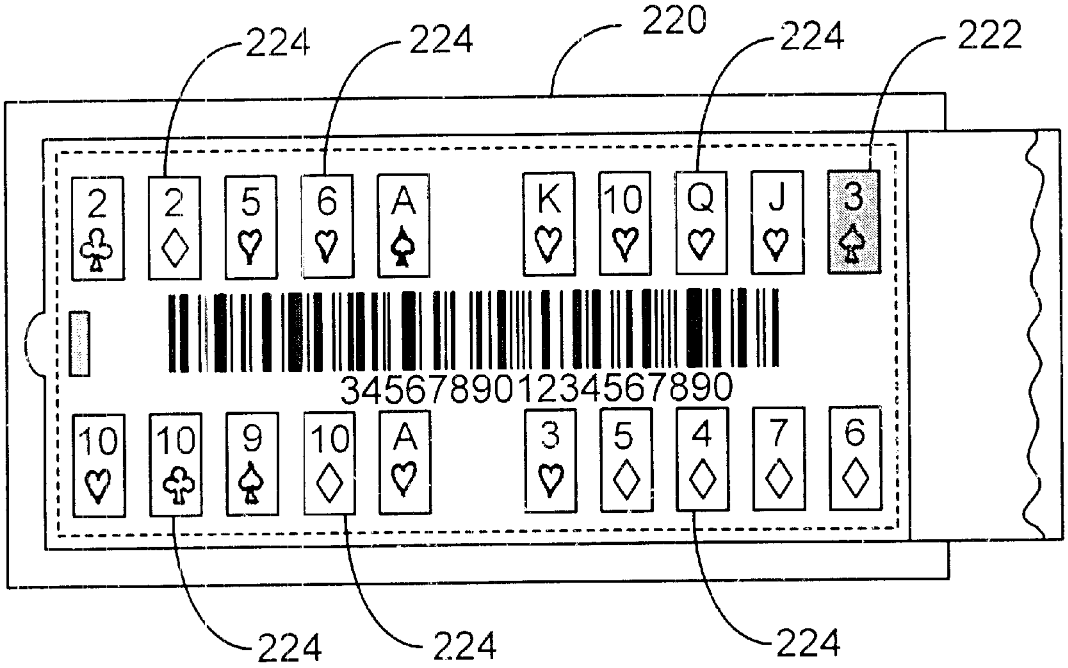
FIG. 10B shows the inside of the alternative form of gaming ticket depicted in FIG. 10A.

To add further interest to the pull-tab game of the present invention, the ability to select replacement symbols can be incorporated into the pull-tab gaming ticket 220 itself as illustrated in FIGS. 10A and 10B. In a preferred form of this embodiment, the gaming indicia are four sets of five card poker hands rather than the numbers 22 used in the preferred embodiment of FIG. 1B. The first set of cards for each of these poker hands consists of poker cards 222 printed on latex, gum-like material, a cardboard flap or other removable surface. If the player is not satisfied with one or more of these cards, the player is given the opportunity to select a replacement card. In the embodiment shown in FIG. 10B, the player can select a replacement card by rubbing off the original latex card 222 to reveal the replacement card 224 printed underneath. Determination of whether a game play is a winning play will be made based upon the final combination of symbols shown, including the replacement symbols. As an alternative replacement card embodiment, the hidden replacement card can be placed adjacent to the original card rather than underneath it. In this alternative embodiment, both the original card and replacement card will be visible when play is complete. As a second alternative, encrypted bar codes can be used in place of the replacement cards 224. In this second alternative embodiment, the player will not know what the replacement symbols are until the gaming ticket is placed in the validation machine.

In a further replacement symbol embodiment, the validation machines 30 can be programmed to not only display the game plays 26 shown on the gaming ticket 10 but also to allow modification of those game plays. For example, the validation machine 30 can be configured to allow the player to electronically discard one or more symbols shown on the gaming ticket and have the validation machine, or the host processor, randomly choose one or more replacement symbols. Determination of whether or not a game play is a winning play can then be made on the basis of the final combination of symbols which includes the replacement symbols. With the use of such replacement symbols, a game of chance has been converted into a game of skill. An electronic machine which is embodied with such "respin" capabilities is illustrated in U.S. Pat. No. 5,704,835.

In the foregoing specification, the invention has been described with reference to specific preferred embodiments and methods. It will, however, be evident to those of skill in the art that various modifications and changes may be made without departing from the broader spirit and scope of the invention as set forth in the appended claims. For example, rather than requiring players to purchase the pull-tab gaming tickets of the present invention, these pull-tab gaming tickets can be given away as part of a sweepstakes or other type of promotion. Further, while use of the validator 30 has been discussed thus far from the perspective of the player, it could just as easily be used by the promoter to validate returned tickets. For such promoter-oriented validator machines 30, the display monitor 50 could be removed as an unnecessary component. As another example, the pull-tab ticket 10 could have a validation code 24 and no indicia 22. In this example, the player would have to insert his pull-tab ticket 10 into a validator 30 and press the "PLAY ONE" button 44 in order to find out what the indicia 22 are for his pulltab ticket 10. In a further modification, the validation code can be eliminated entirely. In this embodiment, the full image of the gaming ticket can be scanned by a computer and conveyed back to the host computer for verification. For these reasons, the specification and drawings are to be regarded in an illustrative, rather than restrictive sense; the invention being limited only by the appended claims.

What is claimed is:

1. A method of allowing player to compete for a progressive jackpot comprising the steps of:

distributing a plurality of gaming tickets to competing players, each of said gaming tickets comprising an opaque sheet showing at least one game play consisting of a combination of multiple numbers and/or symbols, an easily removable opaque cover which hides all the numbers and/or symbols from view and a validation code which is a unique identification of that gaming ticket and not merely a representation of said numbers and/or symbols;

having competing players insert said gaming ticket into a validation machine comprising an acceptor mechanism to both receive said gaming ticket and prepare it for processing, wherein said progressive jackpot is increased by a predetermined amount each time a gaming ticket is inserted into a validation machine;

scanning said unique validation code using a reader and conveying said unique validation code to a processor;

using said processor to determine whether said unique validation code is valid by comparing said unique validation code to a list of legitimate and available validation codes; and displaying the results of game play on said validation machine if said processor determines that said validation code is valid, including displaying whether said competing player has won some or all of said jackpot.

2. The method of claim 1 wherein a plurality of validation machines are linked together and placed under the control of a host computer.

* * * * *